US010412096B2

(12) United States Patent
Wagner

(10) Patent No.: US 10,412,096 B2
(45) Date of Patent: Sep. 10, 2019

(54) WIRELESS AUTHENTICATION BASED ON LOCATION DATA

(71) Applicant: Visa International Service Association, San Francisco, CA (US)

(72) Inventor: Kim R. Wagner, Sunnyvale, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 279 days.

(21) Appl. No.: 15/490,708

(22) Filed: Apr. 18, 2017

(65) Prior Publication Data
US 2018/0302414 A1    Oct. 18, 2018

(51) Int. Cl.
*H04L 29/06* (2006.01)
*H04W 4/02* (2018.01)
*H04W 12/08* (2009.01)
*H04W 12/06* (2009.01)
(Continued)

(52) U.S. Cl.
CPC ........ *H04L 63/107* (2013.01); *G06K 9/00771* (2013.01); *G06K 9/00885* (2013.01); *G06T 7/70* (2017.01); *H04L 63/083* (2013.01); *H04L 63/0861* (2013.01); *H04W 4/02* (2013.01);
(Continued)

(58) Field of Classification Search
CPC ..... G06F 21/31; G06F 21/32; G06K 9/00771; G06K 9/00885; G06T 7/70–75; H04L 63/08; H04L 63/083; H04L 63/0861; H04L 63/107; H04W 4/02–023;
(Continued)

(56) References Cited

U.S. PATENT DOCUMENTS 9,230,272 B1    1/2016  Eramian
2003/0182194 A1*  9/2003  Choey .............. G06Q 20/04
                                                       705/16
2013/0275304 A1   10/2013  Kranzley
(Continued)

FOREIGN PATENT DOCUMENTS

WO    201261574 A2    5/2012

OTHER PUBLICATIONS

International Search Report and Written Opinion, dated Aug. 21, 2018, in PCT Application No. PCT/US2018/028022, 15 pages.
(Continued)

*Primary Examiner* — Kevin Bechtel
(74) *Attorney, Agent, or Firm* — Kilpatrick Townsend & Stockton LLP

(57) ABSTRACT

Embodiments of the invention involve using location data to authenticate individuals wirelessly. In one embodiment, an access device may obtain, by one or more cameras, images of an area captured at different time points, the images including a first image at a first time and a second image at a second time, and where the first image shows the user at a first location and the second image shows the user at a second location. The access device may, based on a position of the user and an association between the user and a communication device, conduct a transaction between the access device and the communication device, where the association between the user and the communication device is based on the first location being proximate to the communication device at the first time and the second location being proximate to the communication device at the second time.

20 Claims, 9 Drawing Sheets

(51) Int. Cl.
*G06T 7/70* (2017.01)
*G06K 9/00* (2006.01)
(52) U.S. Cl.
CPC .......... *H04W 12/06* (2013.01); *H04W 12/08* (2013.01); *G06K 2009/00953* (2013.01)
(58) Field of Classification Search
CPC ... H04W 4/025–029; H04W 4/04–043; H04W 12/06–0605; H04W 12/08
See application file for complete search history.

(56) References Cited

U.S. PATENT DOCUMENTS

| | | |
|---|---|---|
| 2014/0289821 A1 | 9/2014 | Wilson |
| 2014/0337232 A1 | 11/2014 | Glasgo |
| 2015/0012396 A1 | 1/2015 | Puerini et al. |
| 2015/0023562 A1* | 1/2015 | Moshfeghi ............ G01S 5/0263 382/106 |
| 2016/0275534 A1 | 9/2016 | Iwai |
| 2016/0321671 A1 | 11/2016 | Chandrasekaran et al. |
| 2018/0211460 A1* | 7/2018 | Landers, Jr. ....... G07C 9/00158 |

OTHER PUBLICATIONS

Clifford, S. and Hardy, Q., "Attention, Shoppers: Store is Tracking Your Cell," http://www.nytimes.corn/2013/07/15/business/attention-shopper-stores-are-tracking-your-cell.html, 5 pages.
Consumers, Big Data, and Online Tracking in the Retail Industry, http://centerformediajustice.org/wp-content/uploads/2014/06/WALMARTPRIVACY.pdf.
Garun, N., "Amazon Go stores could watch, listen, and remember your every move," http://www.theverge.com/2016/12/6113856158/how-amazon-go-stores-work-patent, 4 pages.

\* cited by examiner

WIRELESS AUTHENTICATION BASED ON LOCATION DATA

CROSS-REFERENCES TO RELATED APPLICATIONS

None.

BACKGROUND

Prior to granting a user access to a resource, contemporary authentication systems often require the user to manually provide their credentials by typing a password on a keypad or scanning a physical security token (e.g., swiping a keycard). More recently, "hand-free" authentication systems have been introduced, which allow the user to provide his or her credentials with minimal input. Some of these hands-free authentication systems controls access to a resource via biometric means. In this regard, an individual could present, for authenticating oneself to an access device of the system, biometric data that is derived from one or more physical characteristics innate to the individual (e.g., a photo of the face, a retinal scan, a fingerprint, a voice print). Thus, an individual would not need to remember passwords, provide answers to security questions, or keep a physical security token.

However, existing biometrics-based authentication systems are not without problems. For instance, such systems can be slow or cumbersome to use. In other cases, users may raise privacy concerns when asked to provide biometric information. Furthermore, biometric data may be vulnerable to theft and abuse by various bad actors. For example, while the vast majority of access devices may be trustworthy, it is possible to encounter an access device that has been hacked or otherwise compromised.

Embodiments of the present invention address these problems and other problems individually and collectively.

BRIEF SUMMARY

Embodiments of the invention are directed to matching location data to images of individuals in order to securely authenticate the individuals over wireless communication technologies.

For example, a first user may register a first mobile device (i.e., a portable communication device) with a remote server, where the remote server associates the first mobile device with an account that can be used by the first user to access resources. At some point, when the first user is at a location associated with a resource provider (i.e., a resource provider location), the first mobile device may detect a beacon being broadcasted by a broadcast device that is associated with the resource provider, where the range of the beacon covers the extent of the resource provider location. In response, the first mobile device may begin to periodically transmit its location (i.e., its latitude and longitude coordinates) to the remote server.

Meanwhile, cameras positioned throughout the resource provider location to monitor the area may continually capture images of the users as they move about the resource provider location. An artificial intelligence (AI) process may be used to detect individuals within the images and determine their positions within the resource provider location. The AI process may track detected individuals based on unique visible features from one image to another. In some cases, each detected individual with a particular physical appearance can be associated with an avatar and the AI process may track the movement of each avatar via images received from the cameras. The information regarding the movements of avatars may be provided to the remote server. The remote server may use a best-fit algorithm to determine which avatar most closely matches the first mobile device by comparing the movement patterns of the first mobile device with those of the avatars.

When the first user approaches the access device to obtain access to a resource, a camera located near the access device may take a picture of the first user. Based on the first user's physical appearance in the picture, the access device may determine which of the avatars is the first user. Because each avatar has been associated with a registered mobile device, the access device can then determine that the first mobile device is associated with the first user. Next, the access device can retrieve the account associated with the first mobile device and use the account to determine whether the resource can be granted to the first user.

One embodiment is directed to a method. The method can include: obtaining, by one or more cameras coupled to or included within an access device, a plurality of images of an area of a resource provider captured at different time points, wherein the plurality of images comprises a first image of the area at a first time point and a second image of the area at a second time point, the first image indicating that a user at the resource provider is at a first location and the second image indicating that the user is at a second location; determining, based on a current position of the user and an association between the user and a communication device, that a transaction is to be conducted between the access device and the communication device, wherein the association between the user and the communication device is based on the first location being proximate to a location of the communication device at the first time point and the second location being proximate to a location of the communication device at the second time point; and responsive to the determining, conducting the transaction between the access device and the communication device.

Other embodiments are directed to systems, access devices, computer servers, portable communication devices, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
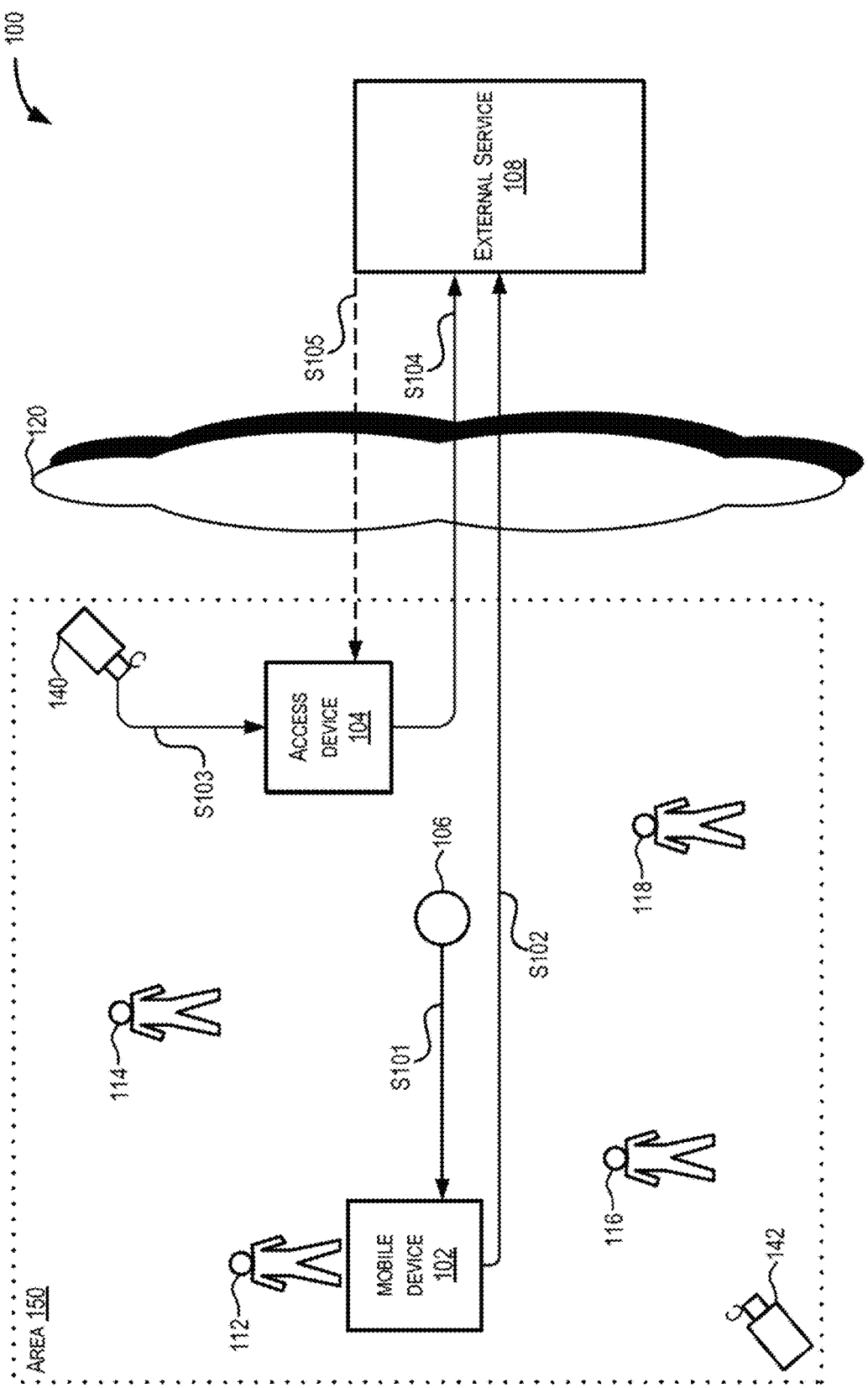
FIG. 1 depicts a system for tracking a mobile device and one or more users at a resource provider location in accordance with some embodiments.

Embodiments of the invention are directed to using location data to securely authenticate individuals over wireless communication technologies. Some embodiments can allow a user to authenticate oneself to an access device to obtain access to a resource provided by a resource provider location, by (1) tracking the location of the user's phone and (2) taking pictures of the user as he or she moves about the resource provider location. The user does not need to take out his or her phone when authenticating onself. Additionally, matching images of the user to the phone's location can be conducted in a way that does not compromise the user's privacy.

For example, a first user may register a first mobile device (i.e., a portable communication device) with a remote server, where the remote server associates the first mobile device with an account that can be used by the first user to access resources. At some point, when the first user is at a location associated with a resource provider (i.e., a resource provider location), the first mobile device may detect a beacon being broadcasted by a broadcast device that is associated with the resource provider, where the range of the beacon covers the extent of the resource provider location. In response, the first mobile device may begin to periodically transmit its location (i.e., its latitude and longitude coordinates) to the remote server. Other mobile devices of other users that are registered with the remote server may also be transmitting their locations to the remote server.

Meanwhile, cameras (e.g., closed-circuit television cameras (CCTV) cameras) positioned throughout the resource provider location to monitor the area may continually capture images of the users as they move about the resource provider location. An artificial intelligence (AI) process may be used to detect individuals within the images and to determine their positions within the resource provider location. To secure the privacy of the users, the AI process may not actually determine the identity of any of the individuals in the images. However, the AI process may be sophisticated enough to track detected individuals based on unique visible features of the individuals (e.g., clothing, hairstyle, physical build, facial feature) from one image to another. In some cases, each detected individual with a particular physical appearance can be associated with an avatar (i.e., a temporary identifier or pseudonym) and the AI process may track the movement of each avatar via images received from the cameras. What results is a consistent map of how each avatar moves around inside the resource provider location. The information regarding the movements of avatars (i.e., avatar location information) may be provided to the remote server.

The remote server may use a best-fit algorithm to determine which avatar most closely matches the first mobile device by comparing the movement patterns of the first mobile device with those of the avatars. In this fashion, the remote server may match each avatar with a registered mobile device at the resource provider location. Stated another way, each registered phone at the resource provider location may be associated with a particular physical appearance.

When the first user approaches the access device to obtain access to a resource, a camera located near the access device may take a picture of the first user. Based on the first user's physical appearance in the picture, the access device may determine which of the avatars is the first user. Because each avatar has been associated with a registered mobile device, the access device can then determine that the first mobile device is associated with the first user. Next, the access device can retrieve the account associated with the first mobile device and use the account to determine whether the resource can be granted to the first user.

Some embodiments of the invention can be directed to a BLE (Bluetooth Low Energy) use case where a customer (i.e., a user) with a smartphone (i.e., a mobile device) shops in a bricks-and-mortar store (i.e., a resource provider location). Here, the correlation between the movement of avatars and the movement of mobile devices can help disambiguate customers at or near the cash register (i.e., an access device) without the customer having to perform any explicit actions.

Before discussing additional specific embodiments and examples, some descriptions of terms used herein are provided below.

As used herein, an "access device" may be any suitable device that can be used to access an external system. For example, an access device can be for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. The access device may also have a biometric reader capable of reading any of the biometric samples described herein or otherwise. The access device may comprise one or more processors and one or more computer-readable media coupled to the one or more processors.

An "authorization request message" may be an electronic message that is sent to request authorization for an action. In some embodiments, an "authorization request message" may be a message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message. It may be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

As used herein, an "electronic wallet" or "digital wallet" can store user profile information, payment information, bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

As used herein, a "mobile device" (sometimes referred to as a mobile communication device) may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of a mobile device is provided below.

As used herein, a "payment account" (which may be associated with one or more payment devices) may refer to any suitable payment account including a credit card account, a checking account, or a prepaid account.

As used herein, a "payment device" may refer to any device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized) and may be in the form of a mobile device as described above. They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. Such devices can operate in either a contact or contactless mode.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

A "resource providing entity" or a "resource provider" can be any entity that provides resources during a transaction. For example, a resource providing entity can be a merchant, a venue operator, a building owner, a governmental entity, etc.

"User identifying information" can be any information associated with a user and that can identify the user. User identifying information can include, but is not limited to, a primary account number (PAN), account identifier, telephone, e-mail address, zip code, mailing address, photo identification, personal identification number (PIN), etc.

I. Wireless Authentication System

Figure 2:
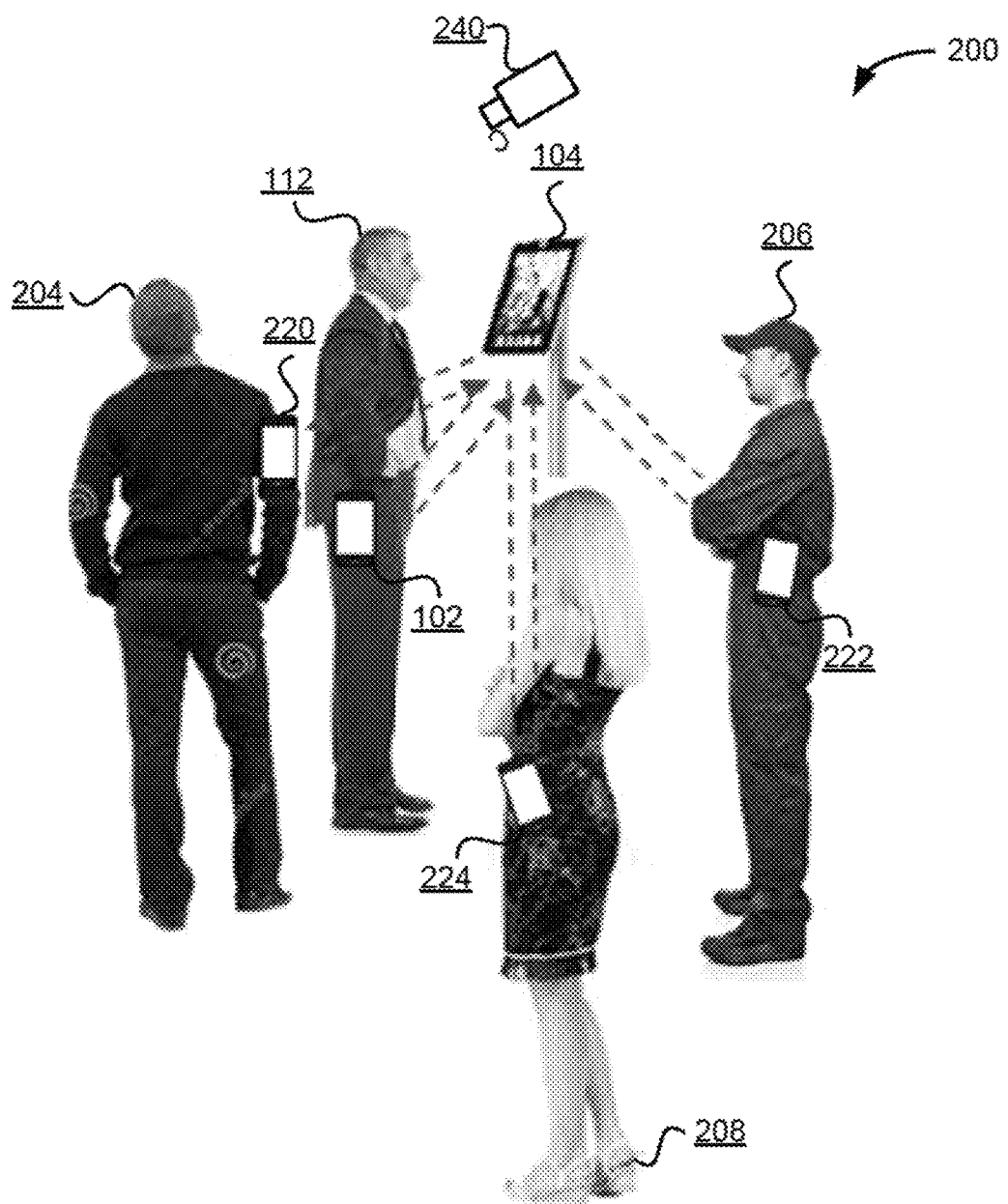
FIG. 2 depicts a system for controlling access to a resource using authentication based on location data in accordance with some embodiments.
Figure 3:
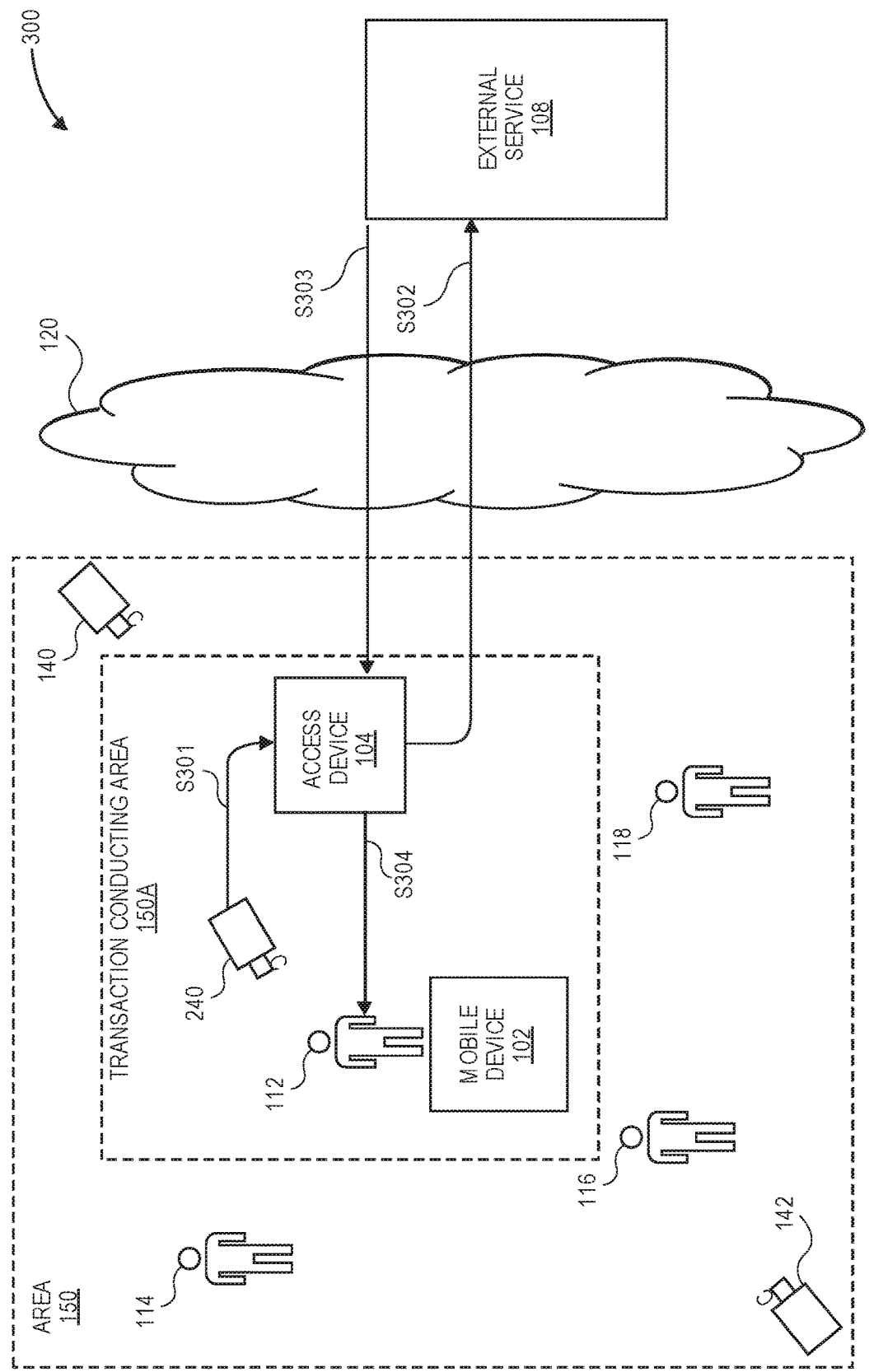
FIG. 3 depicts a system for wirelessly authenticating a user near an access device in accordance with some embodiments.

FIGS. 1, 2, and 3 show diagrams illustrating various aspects of one or more systems for conducting wireless authentication based on location data. In particular, each of the systems may be located at a resource provider location and may include one or more users that are at the resource provider location to conduct a transaction with the resource provider, where each of the users may possess a mobile device.

A. Tracking System

FIG. 1 depicts a system 100 for detecting a mobile device at a resource provider location. System 100 includes a mobile device 102, an access device 104, a transmitting station 106, an external service 108, users 112-118, a communication network 120, and cameras 140-142. The steps depicted in FIG. 1 describe how a mobile device interacts with a transmitting station of a resource provider location prior to interacting with an access device (e.g., prior to checkout).

The mobile device 102 may be a mobile device that is carried by the user 112 while he or she is located within an area 150 that corresponds to a resource provider location. For example, the user 112 may be a customer with a smartphone (i.e., the mobile device) that is shopping in a bricks-and-mortar store (i.e., the resource provider location). Other customers (e.g., users 114-118), each of whom may be carrying his or her own mobile device, may be shopping at the store.

The transmitting station 106 may be a stationary device that is associated with the resource provider location. The transmitting station 106 may periodically broadcast a beacon/signal that covers the area 150. The communication may be carried out using a short-to-medium range wireless communication mechanism. For example, the transmitting station 106 may be a Bluetooth Low Energy (BLE) beacon that broadcasts a periodic signal. When a customer enters the store, the customer's smartphone may detect the signal and begin transmitting the smartphone's location to the external service 108. In some embodiments, the beacon may comprise a transmitting station identifier (i.e., a Beacon ID) that identifies the resource provider location.

The area 150 may correspond to the broadcasting range of the transmitting station 106 and may encompass the mobile device 102, the access device 104, the transmitting station 106, the users 112-118, and the cameras 140-142. In general, when any mobile device is carried into the area 150, the mobile device may detect beacons being broadcasted by the transmitting station 106.

Although this example describes a BLE communication mechanism, it is understood that embodiments of the invention may utilize any suitable wireless communication mechanism. Examples of such communication mechanisms may include the use of a suitable electrical, electromagnetic, or even acoustic mode of communication. For example, embodiments of the invention may use RF, IR, or even audio signals to transmit data to and from two devices in a wireless manner. Preferred communication mechanisms include short-to-medium range wireless communication mechanisms. Examples of communication mechanisms may include Wi-Fi, BLE, classic Bluetooth, etc.

In some embodiments, BLE technology is used as the short range communication protocol or technology. Bluetooth Low Energy is a wireless personal area network technology used for transmitting data over short distances. It is designed for low energy consumption and cost, while maintaining a communication range similar to classic Bluetooth. BLE communication consists primarily of "advertisements," or small packets of data, broadcast at a regular interval by beacons (which may be present in or be a base station) or other BLE enabled devices via radio waves.

The access device 104 may correspond to one or more access devices located at the resource provider location. For example, the access device 104 may be a POS used for conducting transactions with customers at the store. It should be noted that the access device 104 and the transmitting station 106 can be uncoupled or coupled together. In some embodiments, the access device 104 and the transmitting station 106 can be embodied by the same device. In other embodiments, the access device 104 and the transmitting station 106 can be embodied by different devices that communicate with each other over a network (e.g., a local area network (LAN)). The access device 104 may also correspond to a computing device of the resource provider location (e.g., a store computer) running software (e.g., store software) that is configured to receive images from cameras distributed throughout the area 150 (e.g., the cameras 140-142) and analyze the images to track avatars as they move within the area 150. For example, the store may maintain a local server that serves as a digital video recorder (DVR) system or as a network-attached-storage (NAS) device for storing images from cameras distributed throughout the store. As images are received by the local server from the cameras, an AI process running on the local server may analyze the images to track avatars within the store.

The cameras 140 and 142 may together represent one or more cameras that are positioned throughout the area 150 in way so that each part of the area 150 is monitored by at least one of the one or more cameras. For example, a single camera may be enough to monitor the entirety of a particularly small resource provider location. The cameras 140-142 may be surveillance cameras, analog CCTV cameras, wireless analog cameras, wired network cameras, wireless network cameras, or any device that includes a camera capable of capturing images or video of an area over a period of time. The cameras 140-142 may be communicatively coupled over a network (LAN) to the access device 104 so that images can be transferred to the access device 104. In embodiments where analog cameras are used, analog images can first be sent to a digitizing device that digitizes the analog images before sending the digitized images to the access device 104. In some cases, the digitizing device may be coupled to the access device 104. In embodiments where network cameras are used, the network cameras may be communicatively coupled to the external service 108 rather than to the access device 104 so that images can be sent directly to the external service 108.

The external service 108, which can be implemented as a cloud based system or as a server computer system, can be remotely located with respect to the resource provider location. The mobile device 102 and other mobile devices may be registered with the external service 108 and may periodically provide their respective locations to the external service 108 while located within area 150. Meanwhile, one or more access devices, which include the access device 104, may periodically transmit, to the external service 108, information regarding the location of avatars within their respective resource provider locations. Based on location data received from mobile devices and access devices, the external service 108 may attempt to match each mobile device to an avatar.

The mobile device 102, the access device 104, and the external service 108 may be communicatively coupled to the communication network 120. The communication network 120 can be of any type and can include one or more communication networks. Examples of the communication network 120 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, the communication network 120 may include any communication network or infrastructure that facilitates communications between computing devices.

As shown in FIG. 1, the mobile device 102 may be carried by the user as the user enters the area 150. Prior to entering the area 150, the mobile device 102 may be registered with the external service 108 and may have installed a software application or a software plugin provided by the external service 108 that listens for beacons associated with resource provider locations. In some embodiments, even prior to detecting a beacon, the mobile device 102 may periodically transmit the mobile device's location to the external service 108. At this point, the interval between transmissions may be relatively long (e.g., once per minute, once every five minutes) to conserve power.

At step S101, as the user 112 enters into the area 150, the mobile device 102 detects a beacon broadcasted by the transmitting station 106. For example, a customer's smartphone may detect a BLE beacon as the customer enters a store.

At step S102, upon sensing the transmitting station 106, the mobile device 102 may begin reporting the mobile device's location to the external service 108 more frequently (e.g., every 5 or 10 seconds). To conserve power and bandwidth, the reports may be batched. For example, at every minute, the mobile device 102 may send, to the external service 108, a batch report that contains the location of the mobile device 102 at every five second interval for the past minute. Regardless of how the location data is transmitted to the external service 108, the location data can be at a level of fidelity that enables the external service 108 to more or less trace the mobile device's path as the user 112 moves throughout the area 150. Thus, the location reported to the external service 108 may be accurate to within a few feet (e.g., a 5-10 feet radius).

In particular, the location data transmitted by the mobile device 102 to the external service 108 may comprise the mobile device's geographic coordinates (e.g., the mobile device's latitude and longitude coordinates). In some embodiments, the geographic coordinates may be determined at least in part via Global Positioning System (GPS), Assisted GPS (AGPS), a Wi-Fi positioning system (WiPS/WFPS), a mobile phone tracking system, a hybrid positioning system, and/or an Indoor Positioning System (IPS). For instance, the mobile device 102 may communicate with one or more GPS satellites, one or more cell phone towers, one or more femtocells or other cellular base stations, one or more Wi-Fi access points (APs), and/or one or more Bluetooth beacons to determine the mobile device's geographic coordinates. In some embodiments, the mobile device 102 and other mobile devices who have registered with the external service 108 may use a mesh technology (e.g., mesh networking based on BLE) to mutually determine each other's location. For instance, a first mobile device could determine the first mobile device's location via GPS while a second mobile device could determine the second mobile device's location by (1) communicating with the first mobile device (e.g., over BLE) to learn the first mobile device's location and (2) derive the second mobile device's location based on the first mobile device's location and the signal strength of the connection between the first and second mobile devices. As a result, not all mobile devices would need to rely on GPS to determine its location. In certain embodiments, the resource provider location may maintain emitters configured to send out various signals (e.g., ultrasonic sounds) from different locations within the store. In this regard, the mobile device 102 can detect the relative strength of the signals and report the strengths to the access device 104. The access device 104 may then use the strengths to accurately pinpoint the mobile device's location.

Meanwhile, at step S103, the cameras 140-142 periodically transmit images of the area 150 to the access device 104. The frequency at which images are provided to the access device 104 may be comparable or even identical to when the mobile devices provide location data to the external service 108 (e.g., every 5 or 10 seconds). For each period, the access device 104 may receive one or more images from cameras 140-142 that each depicts at least a portion of the area 150 during that period. As mentioned above, the cameras 140-142 are positioned so that any part of the area 150 is monitored by at least one of the cameras. Thus, at any point while the user 112 is within the area 150, the user 112 may be present in at least one of the images of the area that was captured during that time.

For example, after a first five second interval, the access device 104 may receive a first image from the camera 140 that depicts a view of the area 150 from a northeast perspective and a second image from the camera 142 that depicts a view of the area 150 from a southwest perspective. In this example, the first image may depict the user 112 to be located at a first position and the user 114 to be located at a second position while the second image may depict the user 116 to be located at a third position and the user 118 to be located at a fourth position. Five seconds later, the access device 104 may receive a third image from the camera 140 and a fourth image from the camera 142. In this regard, the third image may show that the user 112 has moved to a fifth location while the user 114 has stayed at the second location. Meanwhile, the fourth image may show that the user 116 has moved to the first location (i.e., the location where the user 112 was located five seconds before) while the user 118 has moved to a sixth location.

Upon receiving a set of images for a particular period, the access device 104 may invoke an AI-based recognition process to analyze each of the images to detect individuals depicted in the images. It should be noted that, due to the limited fidelity of the images provided by the cameras 140-142, the distance between the users 112-118 and the cameras 140-142, and/or limitations built into the recognition process, the recognition process may not determine the actual identity of any of the users 112-118. Rather, the recognition process may differentiate detected individuals from each other based on the unique visible features of the individuals. In particular, the recognition process may differentiate between individuals based on major or minor articles of worn clothing (e.g., jacket color, hats type, pants type, the presence of a scarf), accessories (e.g., carried basket, worn backpack, worn glasses), and/or body type (e.g., height and weight), hair color (e.g., curly, long, red, bald), or the like. The recognition process may also determine, based on the images, the locations (e.g., geographic coordinates) of each of the individuals within the area 150

Each time the recognition process detects a new individual in an image, the access device 104 may associate the individual with an avatar, which may correspond to an identifier or pseudonym that uniquely identifies the individual from amongst all individuals being tracked the access device 104. For example, suppose the user 112 and no one else in FIG. 1 wears a red jacket. When the user 112 walks into the area 150, an image taken by the camera 140 may capture the user 112. After the access device 104 receives the image from the camera 140, a recognition process may determine that an individual wearing a red jacket has entered into the area 150. It should be noted that, at this point, the recognition process may not know that the individual wearing the red jacket is the user 112 or is carrying the mobile device 102. Regardless, the access device 104 may associate the individual wearing the red jacket with the avatar "P1." Meanwhile, the three other individuals that correspond to the users 114-118 may be associated with the avatars "P2," "P3," and "P4" respectively.

As later images are received by the access device 104, the recognition process may continue to track the locations of P1, P2, P3, and P4 as they move about the area 150 or until they leave the area 150.

At step S104, the access device 104 reports location data about each of the tracked avatars to the external service 108. In some embodiments, the images may be transmitted to the external service 108, where the external service 108 invokes the recognition process described above. In some embodiments, to conserve bandwidth and to preserve privacy, the access device 104 may not forward the images it receives to the external service 108. Rather, the access device 104 may transmit a set of geographic coordinates to the external service 108, where each of the geographic coordinate is specific to one of the avatars at a particular time. To conserve power and bandwidth, the reports may be batched.

Upon receiving location data about the locations of avatars and registered mobile devices at the resource provider location, the external service 108 may attempt to match each registered mobile device with an avatar. For example, the external service 108 may receive enough location data from the mobile device 102 to be able to trace the mobile device's path over a particular period of time. The external service 108 may also receive enough location data from the access device 104 to be able to trace the paths of all of the avatars in the area 150 over the same particular period of time. If the external service 108 is able to determine that the avatar P1 is always proximate to the mobile device 102 throughout the particular period of time, the external service 108 may associate P1 with the mobile device 102. The steps of associating registered mobile devices with avatars are discussed in further detail below with respect to FIGS. 4-7.

Optionally, at step S105, the external service 108 may transmit a set of associations between registered mobile devices and avatars to the access device 104. For example, the set of associations may include the association between the mobile device 102 and P1. In other embodiments, however, the external service 108 may keep the set of associations to itself to safeguard privacy.

In some embodiments, the access device 104 may perform the matching between avatars and registered mobile devices. In such embodiments, the access device 104 may obtain location data of each registered mobile device in area 150 directly from the mobile devices or from the external service 108.

Regardless of which entity determines the associations or where the associations are stored, when the mobile device 102 nears the access device 104 to perform a transaction, the associations may be used to complete the transaction.

B. Access Device

FIG. 2 depicts a system 200 for controlling access to a resource using authentication based on location data in accordance with some embodiments. In particular, FIG. 2 shows the users 112, 204, 206, and 208 standing in a line in front of a camera 240 to perform a transaction with the access device 104. The users 112, 204, 206 and 208 each carry the mobile devices 102, 220, 222, and 224, respectively. Thus, all of the mobile devices shown in FIG. 2 are within a proximate vicinity of the access device 104. It should be noted that, although FIG. 2 depicts only the mobile devices 102, 220, 222, and 224, there may be additional mobile devices that are considered to be at the resource provider location but not within a proximate vicinity of the access device 104. As shown in FIG. 2, when the user 112 is ready to perform a transaction with the access device 104, the user 112 may stand in front of the access device while the mobile device 102 remains in his or her pocket.

FIG. 3 depicts a system 300 for wirelessly authenticating a user near an access device in accordance with some embodiments. System 300 includes the mobile device 102, the access device 104, the external service 108, users 112-118, the communication network 120, the cameras 140-142 and 240. The steps depicted in FIG. 3 describe how a mobile device interacts with an access device to perform a transaction with the resource provider (e.g., to perform a checkout).

As shown in FIG. 3, the user 112 can carry the mobile device 102 into a transaction conducting area 150A that corresponds to a smaller area within the area 150 that is reserved for conducting transactions (e.g., a checkout line). At this point, the transaction conducting area 150A may encompass the user 112, the mobile device 102, the access device 104, and the camera 240. It should be noted that the access device 104 and the camera 240 may be uncoupled or coupled together. In some embodiments, the access device 104 and the camera 240 can be embodied by the same device. In other embodiments, the access device 104 and the camera 240 can be embodied by different devices that communicate with each other over a network (e.g., a LAN). It should be noted that, in some embodiments, the access device 104 may be located outside of the transaction conducting area 150A and users may interact with the access device 104 through a user interface device (e.g., a touchscreen device) that is communicatively coupled to the access device 104.

At step S301, the camera 240 provides an image the user 112 to the access device 104. When the user 112 enters the transaction conducting area 150A, the camera 240 may capture an image of the user 112. For example, when the user 112 reaches the front of a checkout line, a camera that is built into a POS device may capture video or a photo of the user 112 as he or she stands in front of the POS device. Upon receiving the image, the access device 104 may attempt to match the user 112 to one of the avatars based on the image. In particular, the access device 104 may analyze the physical appearance of the user 112 (e.g., worn clothing, accessories, body type) and attempt to determine an avatar whose physical appearance closely matches that of the user 112 (e.g., similar worn clothing, similar accessories, similar body type). For example, if the image depicts the user 112 as wearing a red jacket, the access device 104 may attempt to find an avatar that is also wearing a red jacket as depicted by images previously received from the cameras 140-142. In this example, the matching avatar may be P1.

At step S302, once an avatar that matches the user 112 has been determined by the access device 104, the access device 104 may submit a request to the external service 108 for user accounts of the user 112 with which to conduct the transaction, where the request includes the matching avatar. In some embodiments, the request may correspond to an authorization request message. Upon receiving the request, the external service 108 may retrieve a mobile device that is associated with the avatar from the set of associations between avatars and mobile devices maintained by the external service 108. Next, the external service 108 may retrieve user accounts that were associated with the mobile device when the mobile device was registered with the external service 108. In some cases, the external service 108 may retrieve user accounts in the form of one or more account identifiers (e.g., a unique string of characters and numbers that identify an account of the user). For example, after the image of the user 112 is matched to the avatar P1, the POS device may transmit a request for payment accounts to the external service 108, where the request includes the avatar P1. In response, the external service 108 may retrieve one or more PANs or payment tokens associated with the user 112, where the one or more PANs or payment tokens were associated with the mobile device 102 during registration.

In embodiments where the access device 104 maintains or has access to the set of associations between avatars and mobile devices, upon determining the matching avatar, the access device 104 may retrieve information that identifies the mobile device (e.g., a phone number, a MAC address, or an IP address) associated with the avatar and include the identifying information in a request for user accounts to the external service 108. In response to receiving information that identifies the mobile device, the external service 108 may retrieve user accounts that are associated with the mobile device.

At step S303, once the external service 108 has retrieved the user accounts, the external service can transmit a response including the user accounts to the access device 104.

At step S304, the access device 104 may present the user accounts to the user 112, thereby allowing the user 112 to choose the user account he or she wishes to conduct the transaction with. For example, in response to receiving the one or more PANs from the external service 108, the POS may display card art for each of the PANs or payment tokens to the user 112 via a touchscreen display, thereby allowing the user 112 to select the desired PAN or payment token by pressing the corresponding card art on the touchscreen display. The chosen user account is then used to complete the transaction between the user 112 and the access device 104. In cases where only one user account is returned, the access device 104 may automatically conduct the transaction with the user 112 without requesting any input from the user 112, thereby keeping the transaction completely hands-free. In some cases where multiple user accounts are returned, the access device 104 may automatically conduct the transaction using a pre-selected user account or a previously selected user account of the user accounts. For example, the user 112 may specify a default user account that is to be automatically used for conducting transactions. As another example, the user 112 may have previously selected a particular user account to conduct a previous transaction. In response, some embodiments may designate the particular user account as the default user account for conducting future transactions. In embodiments where the mobile device 102 can serve as a digital wallet, the access device 104 may communicate with the mobile device 102 to complete the transaction.

Referring back to FIG. 2, after the transaction is finished, the user 112 may leave the transaction conducting area 150A while the user 204, who is next in line, may stand in front of the camera 240 to have his or her picture taken, which causes the access device 104 to repeat steps S301-S304 for a subsequent transaction with the user 204.

In some embodiments, the information regarding the user's movements in the area 150 and the avatar P1 are temporary. Thus, when the user 112 carries the mobile device 102 out of the area 150 and leaves the resource provider location, the access device 104 may delete information relating to the user 112 and the avatar P1. If the user 112 carries the mobile device 102 back into the area 150 for a return visit with the resource provider location, a different avatar may be associated with the mobile device 102.

II. Wireless Biometric Authentication with Location Data

Figure 4:
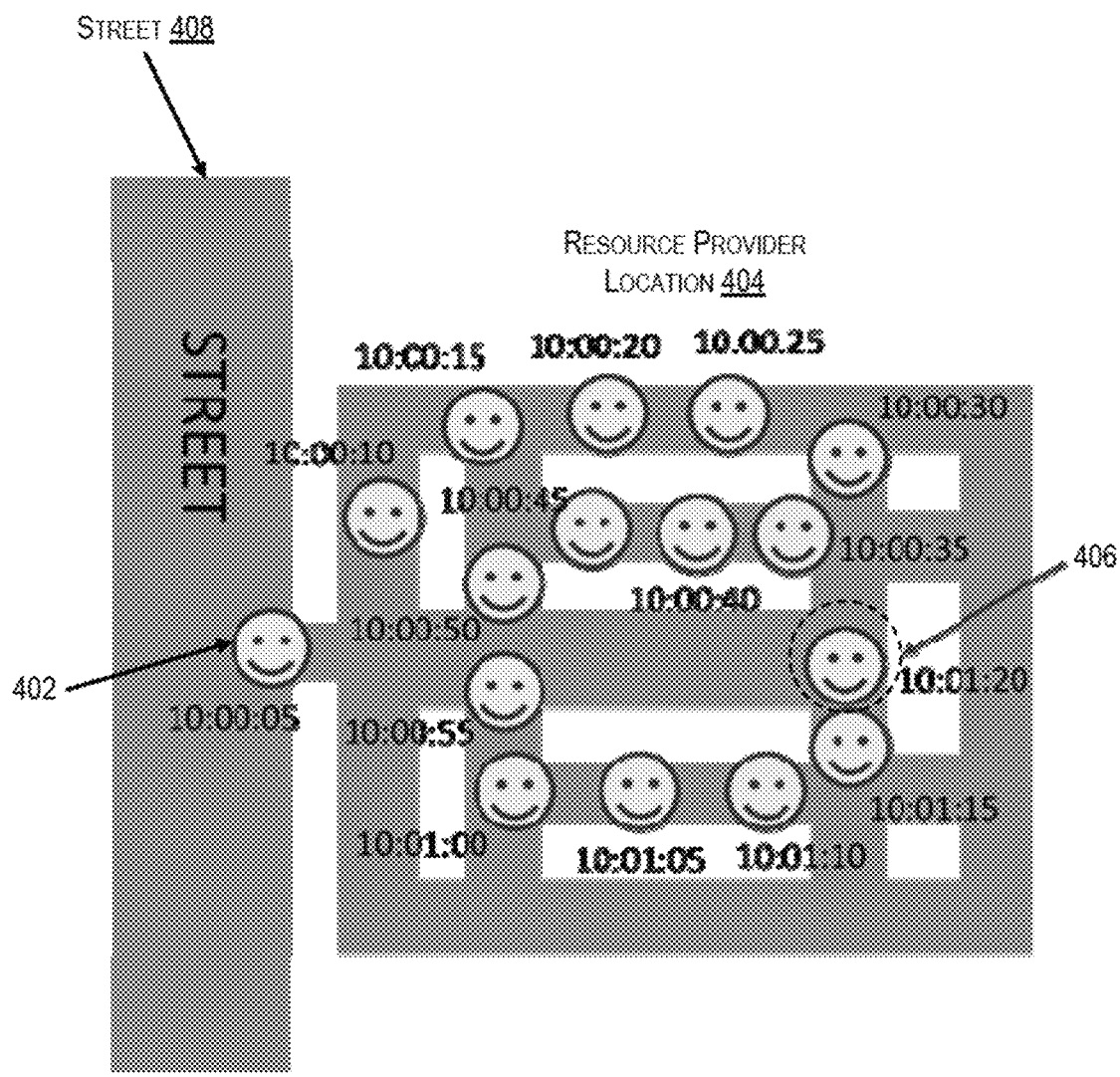
FIGS. 4-7 show a series of diagrams illustrating how a mobile device is matched to one of a plurality of users at a resource provider in accordance with some embodiments.

FIGS. 4-7 show a series of diagrams illustrating how a mobile device is matched to a user of a plurality of users moving around at a resource provider in accordance with some embodiments. In particular, FIG. 4 depicts location data that describes the movement of a mobile device 402 at a resource provider location from time 10:00:05 until time 10:01:20 (i.e., over a period of 75 seconds). Meanwhile, FIG. 5, FIG. 6, and FIG. 7 each depict location data that describes the positions of avatars P1, P2, P3, P4, P5, P6, P7, P8, P9, P10, P11, P12, and P13 at the resource provider location at times 10:00:05, 10:01:00, and 10:01:20, respectively.

In FIG. 4, each of the yellow "smiley" faces corresponds to a geographic location of the mobile device 402 that is indicated by location data sent by the mobile device 402 to an external service. For instance, the smiley face next to the "10:00:05" shows that location data provided by the mobile device 402 to the external service indicates that the mobile device 402 was located at a position inside the area covered by the smiley face at time 10:00:05. It should be noted that the radius of each smiley face indicates uncertainty in location determination (e.g., GPS coordinates may be off by 5-10 feet). Stated another way, the external service can only be certain from the location data that the mobile device 402 was somewhere within the area bounded by the smiley face at time 10:00:05.

Regardless, the location data provided by the mobile device 402 may be detailed enough for one to determine the path of the mobile device 402 during the 75 seconds. The location data indicates that the mobile device 402 enters the resource provider location 404 from the street 408 at time 10:00:05. The location data then indicates that, from time 10:00:10 until time 10:00:30, the mobile device 402 is carried eastward through the most northern aisle of the resource provider location 404. Until time 10:00:50, the mobile device 402 is shown to be carried westward through the second most northern aisle. Until time 10:01:00, the mobile device 402 is shown to be carried southward down to the second most southern aisle. Until time 10:01:20, the mobile device 402 is shown to be carried through the second most southern aisle to a transaction conducting area 406.

As the mobile device 402 provides its location data to the external service, the resource provider location 404 (e.g., the access device 104) provides location data indicating the positions of avatars located within the resource provider location 404.

Figure 5:
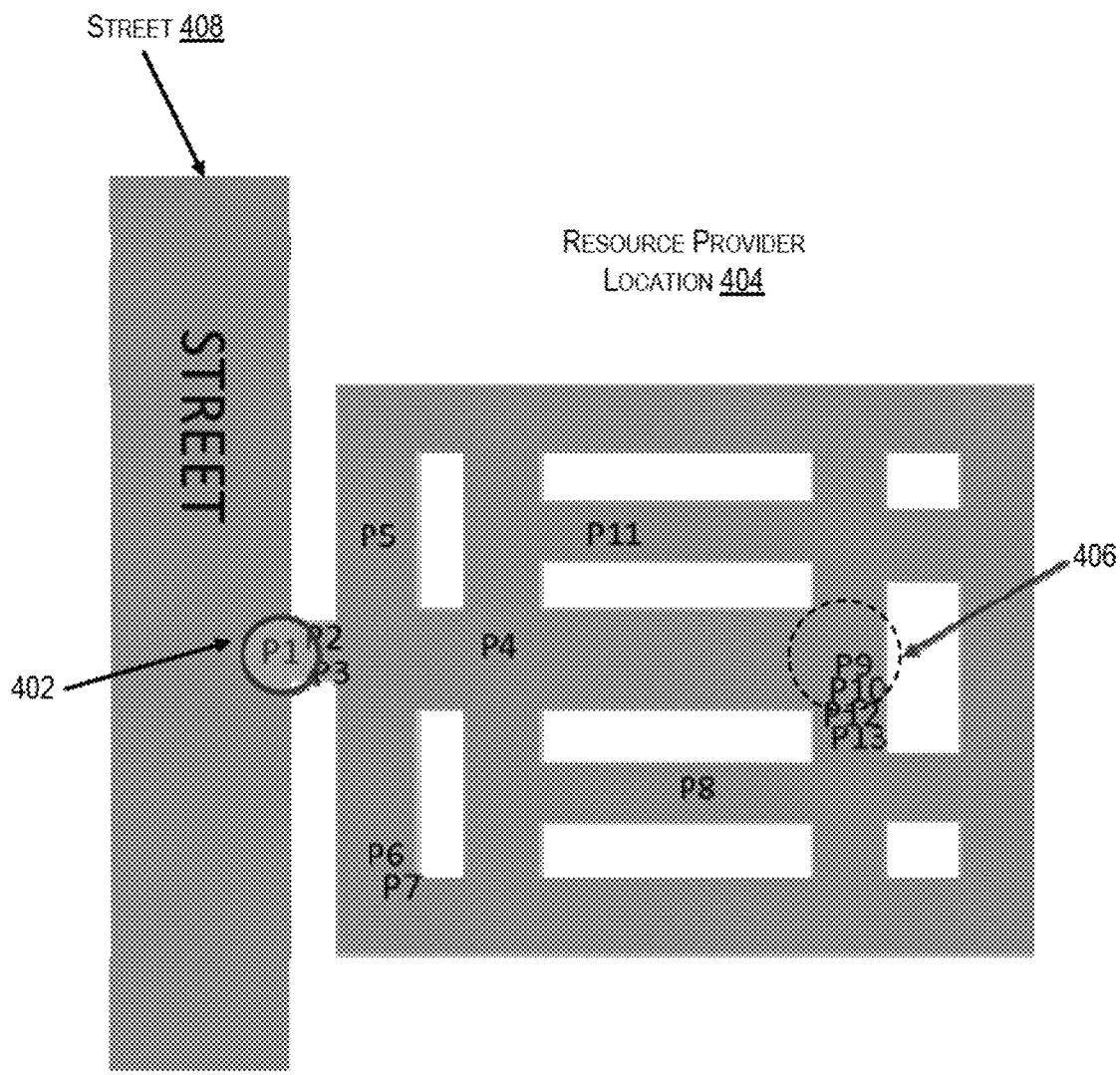

FIG. 5 depicts the locations of avatars P1-P13 at time 10:00:05 as indicated by the location data provided by the resource provider location 404. In particular, avatars P9, P10, P12, and P13 can be seen queueing up near the transaction conducting area to conduct transactions. Meanwhile, avatars P1, P2, and P3 are located near the entrance. The yellow circle shown near the entrance depicts the general location of the mobile device 402 as indicated by location data provided by the mobile device 402. Thus, based on location data received from the mobile device 402 and the location data received from the resource provider location 404 through time 10:00:05, the external service may determine that the mobile device 402 corresponds to one of avatars P1, P2, and P3 and not to any of the avatars P4-P13. However, the external service may need to continue tracking the mobile device 402 and the avatars before it can eliminate two out of the three possible avatars.

Figure 6:
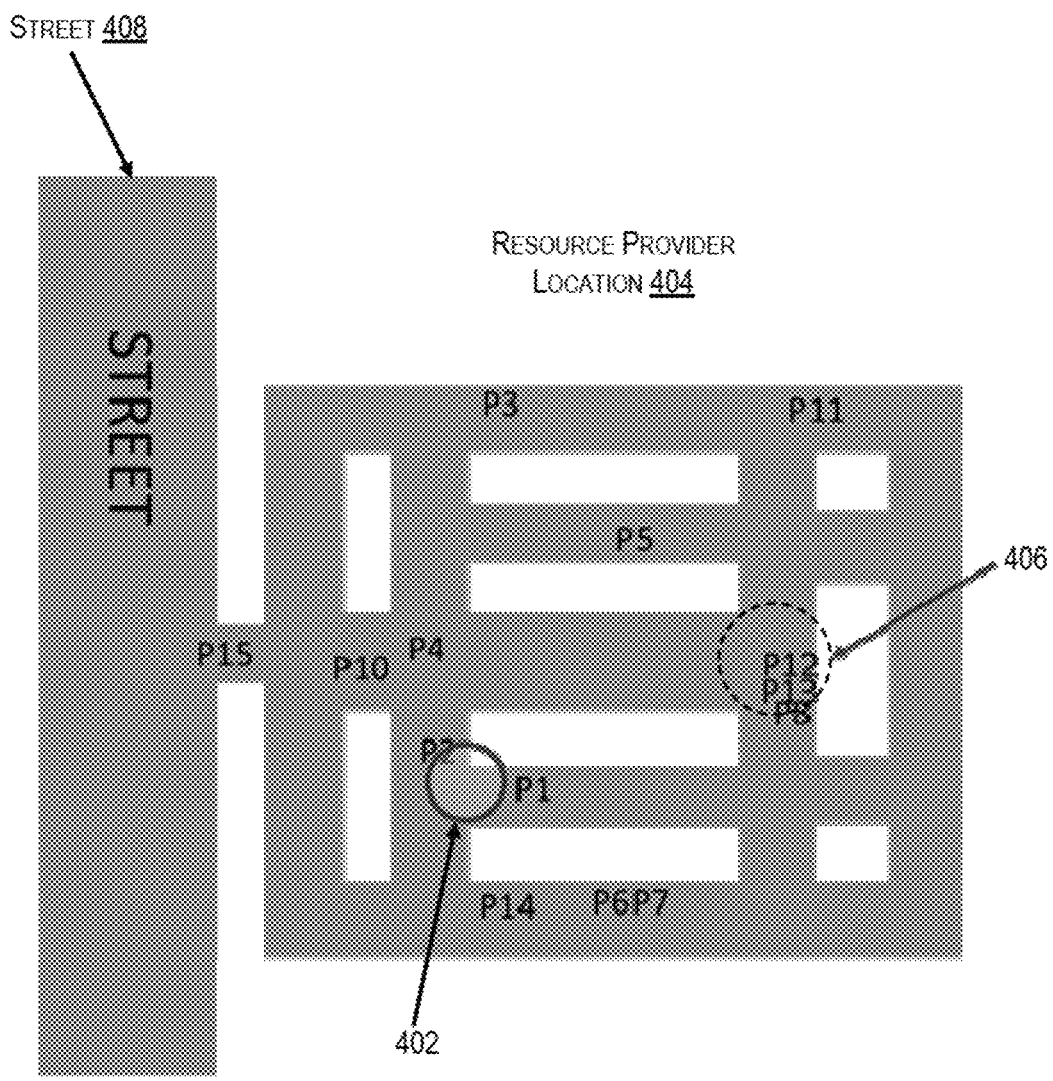

FIG. 6 depicts the locations of avatars P1-P15 at time 10:01:00 as indicated by the location data provided by the resource provider location 404. As can be seen in FIG. 6, avatars P14 and P15 have entered the area, avatar P9 has left the area, and the rest of the avatars have moved to different parts of the resource provider location 404. Because P3 at time 10:01:00 is far away from the mobile device 402, the external service may eliminate P3 from matching the mobile device 402, leaving just avatars P1 and P2 as potential matching avatars.

Figure 7:
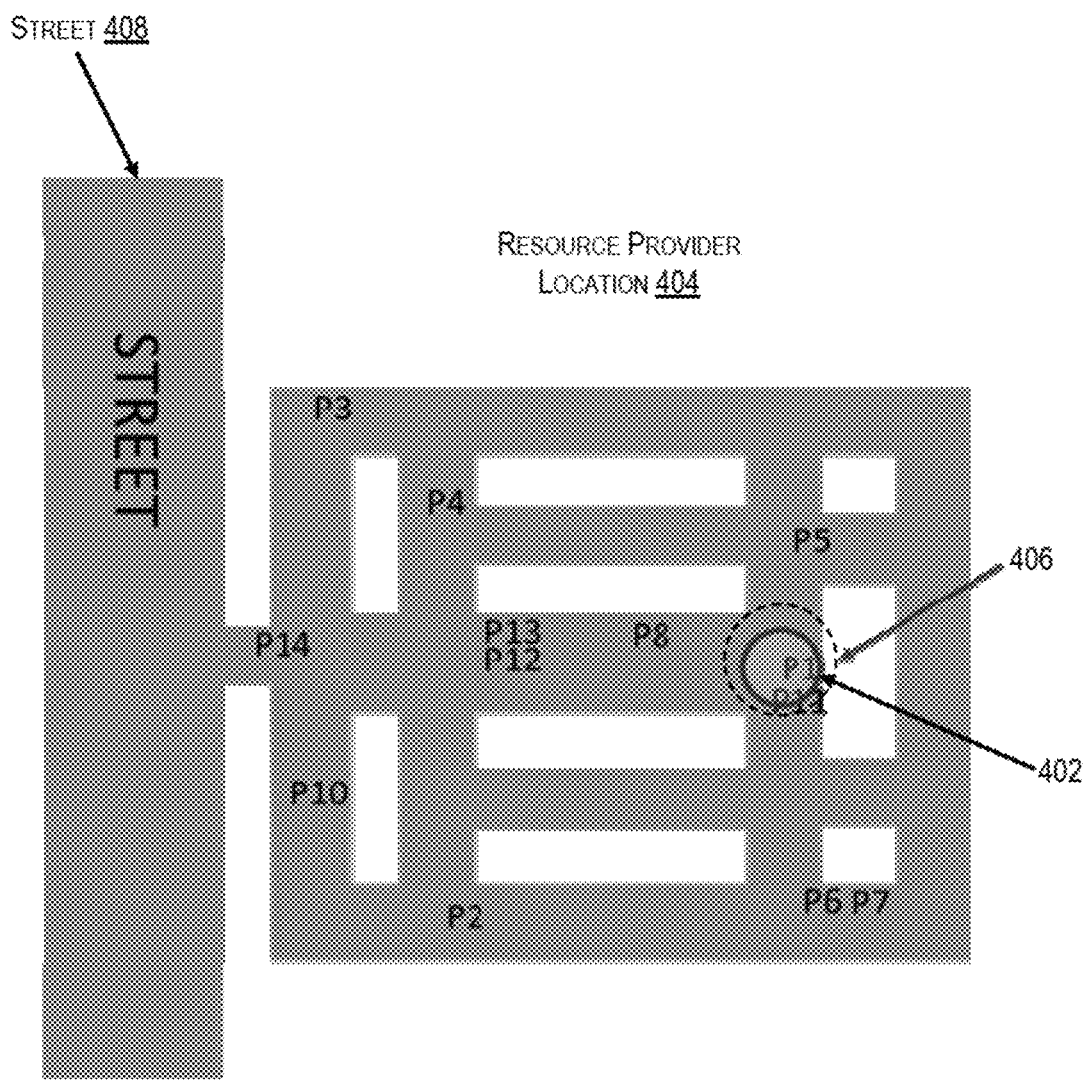

FIG. 7 depicts the locations of avatars P1-P14 at time 10:01:20 as indicated by location data provided by the resource provider location 404. As can be seen in FIG. 7, avatar P15 has left, P14 seems to be leaving the area, and the rest of the avatars have moved to different parts of the resource provider location 404. Because P2 at time 10:01:20 is far away from the mobile device 402, the external service may eliminate P2 from matching the mobile device 402, leaving just P1 as a potential matching avatar. At this point, the external service may associate the avatar P1 with the mobile device 402. Thus, when the user carrying the mobile device 402 has his or her picture taken next to an access device at the transaction conducting area 406, the resource provider location 404 may first match that picture to avatar P1 based on the user's physical appearance. Next, the resource provider location 404 may send a request for user accounts to the external service, where the request specifies the avatar P1. Upon receiving the request, the external service may respond with user accounts associated with the mobile device 402. The user accounts are then used by the access device to conduct the transaction.

Figure 8:
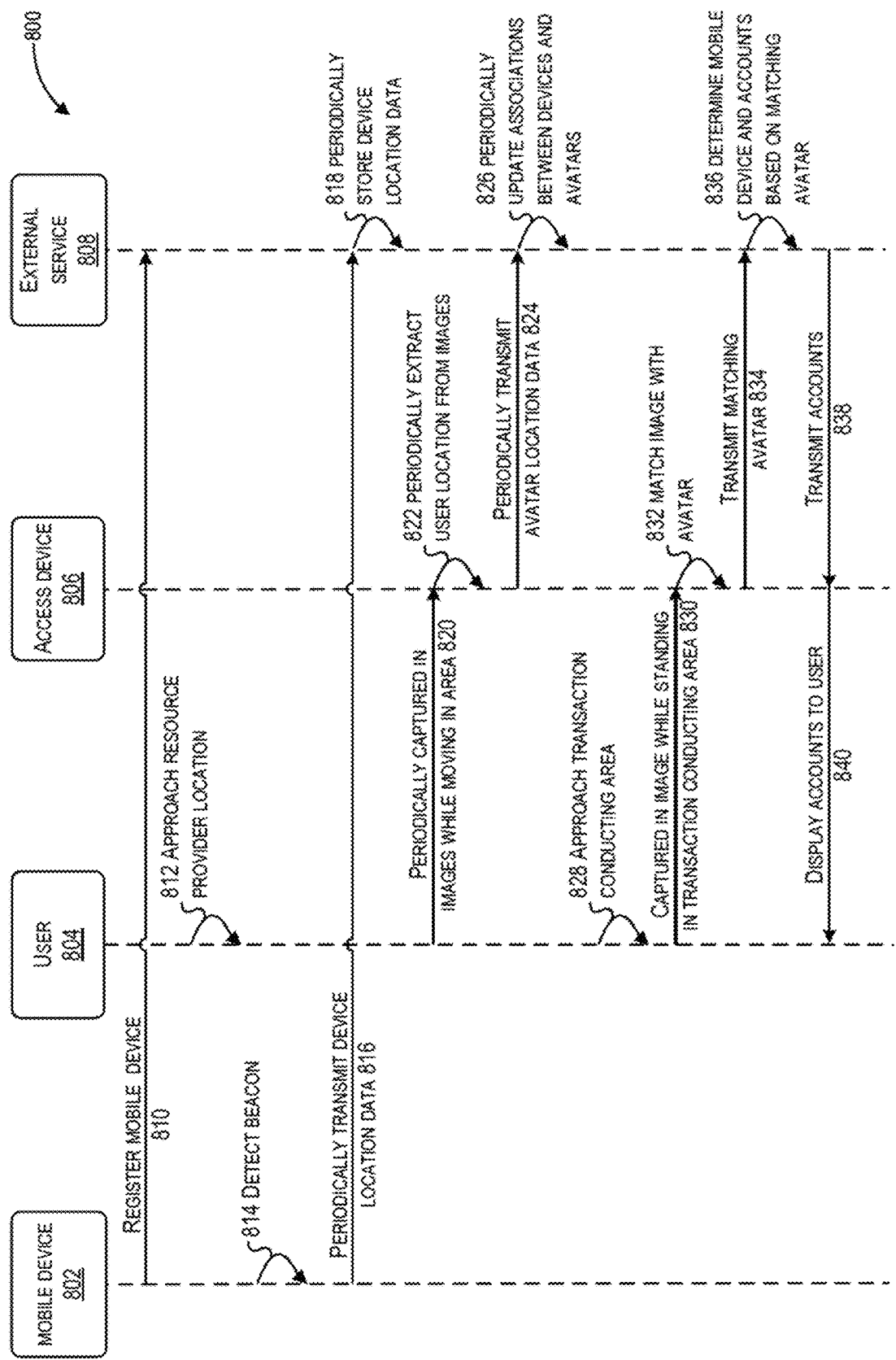
FIG. 8 illustrates a sequence diagram showing operations for wirelessly authenticating a user based on location data in accordance with embodiments.

FIG. 8 illustrates a sequence diagram showing operations for wirelessly authenticating a user based on location data in accordance with embodiments. As described in FIG. 8, system 800 includes a mobile device 802, a user 804, an access device 806, and an external service 808. Note that in some embodiments, the mobile device 802, the user 804, the access device 806, and the external service 808 may be analogous to the mobile device 102, the user 112, the access device 104, and the external service 108, respectively.

At step 810, the user 804 may register the mobile device 802 with the external service 808. In some embodiments, the registration process may involve installing a software application or a software plugin onto the mobile device 802. The software application may be configured to detect beacons of resource provider locations and periodically report the geographic location of the mobile device 802 to the external service 808 under various circumstances. The registration process may also involve the external service 808 associating the mobile device 802 with one or more user accounts (e.g., PANs, payment tokens, authentication accounts) of the user 804, where the associations are stored within a persistent data store (e.g., a database) of the external service 808.

At step 812, the user 804 may approach or enter a resource provider location while carrying the mobile device 802. In some embodiments, the mobile device 802 may already be reporting its geographic location to the external service 808, albeit at a relatively low frequency to conserve power and bandwidth. In some embodiments, to prevent a fraudster from spoofing the mobile device 802, the mobile device 802 may engage in one or more cryptographic interactions (e.g., perform a cryptographic handshake) with the external service 808 while reporting the mobile device's location to the external service 808.

At step 814, the mobile device 802 may detect a beacon being broadcasted by a transmitting station of the resource provider location.

At step 816, the mobile device 802 may begin periodically transmitting device location data pertaining to the mobile device's geographic location to the external service 808. In embodiments where the mobile device 802 was already reporting its location to the external service 808, the mobile device 802 may increase the reporting frequency. In particular, each report may comprise the geographic coordinates of the mobile device 802 and an identifier of the mobile device 802 (e.g., MAC address, IP address, and/or phone number). In some embodiments, the mobile device 802 may send batch reports that contain multiple locations of the mobile device 802 over multiple points in time.

At step 818, the external service may periodically receive device location data from the mobile device 802 and store the device location data. In some embodiments, the location data may be stored in an entry of a data store that is associated with the mobile device's identifier.

Meanwhile, at step 820, the user 804 may be periodically captured in images taken by one or more cameras positioned throughout the resource provider location to monitor the area. The one or more cameras may then provide the images to the access device 806.

At step 822, the access device 806 may periodically receive one or more images from the one or more cameras. The access device 806 may then analyze the one or more images to detect individuals within the one or more images. Next, for each detected individual, the access device 806 may associate the detected individual with (1) a previously created avatar if the detected individual was previously detected in a previous set of images or (2) a newly created avatar if this is the first time the access device 806 has observed the detected individual. Because the access device 806 may differentiate each individual from each other based on their physical appearances (e.g., a worn article of clothing, a carried item, a hair color, a height, a weight, or a combination thereof), each avatar is essentially associated with a physical appearance or one or more visible features that distinguishes the avatar from all of the other avatars. The access device 806 may then determine the location of each avatar based on the images and record the locations of each avatar as avatar location data. In this fashion, the access device 806 may continue to track and record the movement of each avatar in the resource provider location via each subsequent set of images received from the cameras.

At step 824, the access device 806 may periodically transmit avatar location data to the external service 808. In particular, each report provided by the access device 806 may comprise a plurality of avatars each associated with location data (e.g., geographic coordinates). In embodiments where the access device 806 batches reports to save bandwidth, each of the plurality of avatars may be associated with a plurality of geographic coordinates, where each of the plurality of geographic coordinates is associated with a timestamp.

At step 826, the external service 808 may periodically receive avatar location data from the access device 806 and update associations between mobile devices and avatars based on the avatar location data and the device location data. The locations for each of the avatars may be stored at a persistent data store. To determine which of the avatars matches the mobile device 802, the external service 808 may compare the locations of the mobile device 802 at various time points with those of each of the avatars. For a particular avatar, the external service 808 may calculate a sum of squared distances between the avatar and the mobile device 802. To calculate the sum of squared distances, the external service 808 may calculate a distance between the avatar's location and the mobile device's location for a plurality of time points within a time window to obtain a plurality of distances. Next, the squares of each of the plurality of distances are added together to obtain the sum of squared distances between the avatar and the mobile device 802. In this fashion, a sum of squared distances may be calculated between the mobile device 802 and each of the avatars located at the resource provider location. The avatar that has the smallest sum of squared distances with the mobile device 802 is determined to be the matching avatar. In this fashion, the external service 808 may update and maintain a set of associations between avatars and mobile devices that are at the resource provider location.

At step 828, the user 804 approaches a transaction conducting area within the resource provider location while carrying the mobile device 802. For example, the user 804 may queue at a checkout line in front of a POS device.

At step 830, the user 804 is captured in an image while standing in the transaction conducting area. For example, when the user 804 reaches the front of the checkout line, a camera next to the POS device may take a photo of the user 804. The image may then be provided to the access device 806.

At step 832, the access device 806 may match the image with an avatar that is being tracked by the access device 806. In particular, the access device 806 may analyze a physical appearance (e.g., one or more visible features that distinguish the user 804 from other all other users at the resource provider location) of the user 804 in the image and determine which avatar possesses the most similar physical appearance. In particular, the one or more visible features used to match the image to an avatar may include a worn article of clothing, a carried item, a hair color, a height, a weight, or a combination thereof.

At step 834, the access device 806 may transmit a request including the matching avatar to the external service 808. In particular, the request may be a request for user accounts of the user 804 with which to complete a transaction. In some embodiments, the request may correspond to an authorization request message.

At step 836, the external service 808 may determine a mobile device and one or more user accounts based on the matching avatar received in the request. In particular, the external service 808 may use the matching avatar to retrieve the associated mobile device from the set of associations, which in this case may be mobile device 802. Next, the external service 808 may retrieve one or more user accounts of user 804 that are associated with the mobile device 802. For example, the external service 808 may retrieve multiple PANs or payment tokens of the user 804 that are associated with the mobile device 802.

At step 838, the external service 808 may transmit the one or more user accounts to the access device 806 in a response. In some embodiments, the response may be an authorization request response.

At step 840, the access device 806 may display the one or more user accounts to the user 804, thereby allowing the user 804 to select a user account for conducting the transaction. For example, upon receiving the PANs or payment tokens, the POS device may display a card art for each of the PANs or payment tokens to the user 804 at a touchscreen device, thereby allowing the user 804 to select a payment account to checkout with. Once the user 804 selects a payment account, the POS device may submit an authorization request message to a payment processing network associated with the selected payment account. In some embodiments, when an authorization approval is received, the receipt may be wirelessly communicated to the mobile device 802. (e.g., via SMS).

In some embodiments, to mitigate fraud, certain additional authentication mechanisms may be added to the sequence of steps illustrated in FIG. 8. In particular, after a user account has been selected by the user 804, the user 804 may be requested to (1) unlock the mobile device 802 (e.g., where the user 804 would need to enter a password to unlock the mobile device 802), (2) provide one or more biometric samples (e.g., a fingerprint or a photo of his or her face), or (3) answer one or more knowledge-based questions (e.g., provide a PIN, identify an image that was previously selected by the user 804, or reproduce a squiggle or a signature on a touchpad coupled to the access device 806).

In some embodiments, if a plurality of users carrying registered mobile devices (e.g., a husband and wife couple) more or less stay close together as they move within the resource provider location, when one of the plurality of users attempts to perform a transaction, the external service 808 may provide the access device 806 all of the user accounts associated with any of the mobile devices of the plurality of users. In turn, the access device 806 may present all of the user accounts to the user to choose (e.g., where the wife may choose one of her payment accounts or one of her husband's payment accounts).

In some embodiments, an external service may receive, from a communication device located within an area of a resource provider, a plurality of locations of the communication device at different time points, wherein the plurality of locations of the communication device comprises a location of the communication device at a first time point and a location of the communication device at a second time point. Next, the external service may receive, from an access device, a plurality of locations of a user at the resource provider at the different time points, wherein the plurality of locations of the user comprises a location of the user at the first time point and a location of the user at the second time point. The external service may then determine an association between the user with the communication device based on the location of the user at the first time point being proximate to the location of the communication device at the first time point and the location of the user at the second time point being proximate to the location of the communication device at the second time point. Next, the external service may communicate the association between the user and the communication device to the access device, thereby enabling the access device to conduct a transaction with the communication device.

III. Portable Communication Device

Figure 9:
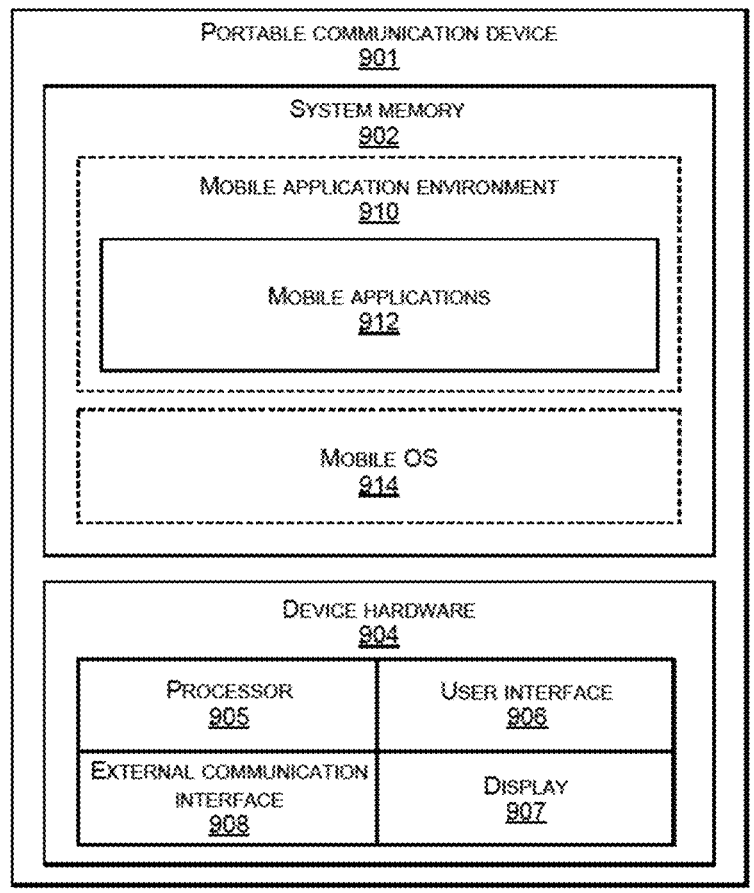
FIG. 9 shows a block diagram of a portable communication device in accordance with some embodiments.

FIG. 9 illustrates a block diagram of a portable communication device 901, according to some embodiments. The device 901 may be an example of the previously described mobile devices (e.g., mobile device 102). Portable communication device 901 may include device hardware 904 coupled to a memory 902. Device hardware 904 may include a processor 905, a communications subsystem 908, user interface 906, and a display 907 (which may be part of user interface 906). Processor 905 can be implemented as one or more integrated circuits (e.g., one or more single core or multicore microprocessors and/or microcontrollers), and is used to control the operation of portable communication device 901. Processor 905 can execute a variety of programs in response to program code or computer-readable code stored in memory 902, and can maintain multiple concurrently executing programs or processes. Communications subsystem 909 may include one or more RF transceivers and/or connectors that can be used by portable communication device 901 to communicate with other devices and/or to connect with external networks. User interface 906 can include any combination of input and output elements to allow a user to interact with and invoke the functionalities of portable communication device 901. In some embodiments, display 907 may be part of user interface 906.

Memory 902 can be implemented using any combination of any number of non-volatile memories (e.g., flash memory) and volatile memories (e.g., DRAM, SRAM), or any other non-transitory storage medium, or a combination thereof media. Memory 902 may store a mobile OS 914 and a mobile application environment 910 where one or more mobile applications reside 912 (e.g., a payment application such as a mobile wallet application, merchant application, mobile location application, etc.) to be executed by processor 905. Also, the memory 902 may store computer code, executable by the processor 905, for performing any of the functions described herein.

Some entities or components described herein may be associated with or operate one or more computer apparatuses to facilitate the functions described herein. Some of the entities or components described herein, including any server or database, may use any suitable number of subsystems to facilitate the functions.

Examples of such subsystems or components can be interconnected via a system bus. Additional subsystems such as a printer, keyboard, fixed disk (or other memory comprising computer readable media), monitor, which is coupled to display adapter, and others are shown. Peripherals and input/output (I/O) devices, which couple to I/O controller (which can be a processor or other suitable controller), can be connected to the computer system by any number of means known in the art, such as serial port. For example, serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

Embodiments of the invention provide for a number of advantages. For example, embodiments of the invention may allow users to perform hands-free transactions so long as the user possesses a mobile device that can wirelessly communicate with the resource provider. In particular, the use of biometric samples to automatically associate a user's image with his or her mobile device frees the user from having to manually provide the association between the user and the user's mobile device to the resource provider. Additionally, embodiments of the invention may enable a user to participate in biometrics-based hands-free transactions while reducing risks to the user's biometric samples being compromised. In particular, the use of fuzzy extractor-based encryption may secure a user's biometric samples from being revealed to other nearby mobile devices while the use of large and small templates may reduce the risks of a rogue access device stealing the user's biometric samples. Furthermore, embodiments of the invention may provide a wireless biometric authentication system that is fully automated and does not need any human input from a human operator during a user's authentication process Messages between the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

Other embodiments of the invention are also contemplated. Other embodiments of the invention may include the following: obtaining, by a mobile device, a second biometric sample of a user; generating a second small biometric template and a second large biometric template from the biometric sample; generating a first secret cryptographic key and a public value by passing the second large biometric template to a first function of a fuzzy extractor; transmitting the public value to an access device; receiving, from the access device, an encrypted first large biometric template that is encrypted with a secret cryptographic key that is generated by passing the public value and a first small biometric template to a second function of the fuzzy extractor, wherein the first small biometric template is generated from a first biometric sample on the access device; attempting to decrypt the encrypted first large biometric template with the first secret cryptographic key; responsive to decrypting the encrypted first large biometric template, determining whether the first large biometric template matches the second large biometric template; and responsive to determining that the first large biometric template matches the second large biometric template, sending a confirmation of the match to the access device.

Another embodiment of the invention can be directed to an access device that includes code, executable by a processor, to perform the above described method.

Other embodiments of the invention may include the following: obtaining, by an access device, a first biometric sample of a user; generating a first small biometric template and a first large biometric template from the first biometric sample; for each mobile device of a plurality of mobile devices within a proximate vicinity of the access device, the plurality of mobile devices comprising a first mobile device: retrieving a public value of the mobile device, wherein: the public value of the mobile device was generated by passing a small biometric template of the mobile device to a first function of a fuzzy extractor; and the small biometric template of the mobile device was generated from a biometric sample of the mobile device; generating a secret cryptographic key by passing the first small biometric template and the public value of the mobile device to a second function of the fuzzy extractor; encrypting the first large biometric template with the secret cryptographic key; and broadcasting the encrypted first large biometric template to the plurality of mobile devices;

Another embodiment of the invention can be directed to an access device that includes code, executable by a processor, to perform the above described method.
receiving, from the first mobile device, a confirmation of a match between the first large biometric template and a biometric template of the first mobile device, wherein the biometric template of the first mobile device was generated from a biometric sample of the first mobile device; and responsive to the confirmation, conducting a transaction between the access device and the first mobile device Specific details regarding some of the above-described aspects are provided above. The specific details of the specific aspects may be combined in any suitable manner without departing from the spirit and scope of embodiments of the invention. For example, although the embodiments described above relate to authentication processing, other types of processing can be performed using embodiments of the invention. For example, since embodiments of the invention can verify that a user is actually at a specific location, embodiments of the invention could also be used to provide incentives or rewards to a user.

It should be understood that the present invention as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   obtaining, by one or more cameras coupled to or included within an access device, a plurality of images of an area of a resource provider captured at different time points, wherein the plurality of images comprises a first image of the area at a first time point and a second image of the area at a second time point, the first image indicating that a user at the resource provider is at a first location and the second image indicating that the user is at a second location;
   determining a first proximity of the first location to a location of a communication device at the first time point and a second proximity of the second location to a location of the communication device at the second time point;
   determining an association between the user and the communication device based on the determined first proximity and second proximity;
   determining, based on a current position of the user and the association between the user and the communication device, that a transaction is to be conducted between the access device and the communication device; and
   responsive to the determining that the transaction is to be conducted, conducting the transaction between the access device and the communication device.

2. The method of claim 1, further comprising:
   generating, based on the plurality of images, information indicating that the user is at the first location at the first time point and that the user is at the second location at the second time point; and
   transmitting the information to a computer, thereby enabling the computer to determine the association between the user and the communication device.

3. The method of claim 2:
   wherein the plurality of images indicate one or more other users located within the area during the different time points;
   wherein the method further comprises:
      generating, based on the plurality of images, other information indicating locations of the one or more other users in the area during the different time points; and
      transmitting the other information to the computer; and
   wherein the association between the user and the communication device is further based on the other information.

4. The method of claim 3, wherein determining the association between the user and the communication device comprises:
   receiving, at the computer and from the communication device, the location of the communication device at the first time point and the location of the communication device at the second time point;
   calculating a first sum of squared distances of the user and the communication device by adding a square of a distance between the first location and the location of the communication device at the first time point and a square of a distance between the second location and the location of the communication device at the second time point;
   calculating, for each of the one or more other users, a sum of squared distances of the other user and the communication device; and
   determining that the first sum of squared distances is smaller than each of the sums of squared distances.

5. The method of claim 4, wherein the communication device transmits the location of the communication device at the first time point and the location of the communication device at the second time point in response to detecting a beacon that corresponds to the area of the resource provider.

6. The method of claim 1, wherein the one or more cameras are configured to monitor the area.

7. The method of claim 1:
   wherein the communication device is associated with one or more account identifiers;
   wherein one or more account identifiers is used to conduct the transaction between the access device and the communication device; and
   wherein conducting the transaction between the access device and the communication device comprises presenting the one or more account identifiers to the user, thereby enabling the user to select an account identifier from amongst the one or more account identifiers to conduct the transaction.

8. A system comprising:
   an access device and a computer; and
   one or more cameras coupled to or within the access device, wherein the access device and the computer comprise:
      at least one processor, and
      a computer-readable medium coupled to the at least one processor, the computer-readable medium storing one or more instructions which, upon execution by the at least one processor, cause the at least one processor to perform operations for:
         receiving data for a plurality of images of an area of a resource provider captured at different time points from the one or more cameras, wherein the plurality of images comprises a first image of the area at a first time point and a second image of the area at a second time point, the first image indicating that a user at the resource provider is at a first location and the second image indicating that the user is at a second location;
         determining a first proximity of the first location to a location of a communication device at the first time point and a second proximity of the second location to a location of the communication device at the second time point;
         determining an association between the user and the communication device based on the determined first proximity and second proximity;
         determining, based on a current position of the user and the association between the user and the communication device, that a transaction is to be conducted between the access device and the communication device; and responsive to the determining that the transaction is to be conducted, conducting the transaction between the access device and the communication device.

9. The system of claim 8,
wherein the user is a first user;
wherein the first image further indicates that a second user is at a third location and the second image further indicates that the second user is at a fourth location; and
wherein the association between the user and the communication device is further based on the third location being less proximate than the first location to the location of the communication device at the first time point or the fourth location being less proximate than the second location the location of the communication device at the second time point.

10. The system of claim 9, wherein the instructions further cause the at least one processor to perform operations for:
determining, based on the first image, that, at the first time point, the first user is at the first location and the second user is at the third location; and
determining, based on the second image, that, at the second time point, the first user is at the second location and the second user is at the fourth location.

11. The system of claim 10:
wherein determining, based on the first image, that the first user is at the first location at the first time point comprises:
  detecting, within the first image, a first individual with a visible feature that distinguishes the first individual from all other individuals in the first image; and
  associating the first individual with the first user based on the visible feature; and
wherein determining, based on the second image, that the first user is at the second location at the second time point comprises:
  detecting, within the second image, a second individual with the visible feature; and
  identifying the second individual as the first user based on the second individual having the visible feature.

12. The system of claim 11, wherein the instructions further cause the at least one processor to perform operations for:
capturing an image of a single individual by a camera in the one or more cameras near the current position when the single individual moves to the current position; and
identifying the single individual as the user based on the image of the single individual and the plurality of images.

13. The system of claim 12, wherein identifying the single individual as the first user comprises detecting, within the image of the single individual, that the single individual has the visible feature.

14. The system of claim 11:
wherein associating the first individual with the first user comprises generating an identifier for the first user and associating the first individual with the identifier; and
wherein identifying the second individual as the first user comprises associating the second individual with the identifier.

15. The system of claim 11 wherein the visible feature is:
a worn article of clothing;
a carried item;
a hair color;
a height;
a weight;
a facial feature;
or a combination thereof.

16. A method comprising:
responsive to detecting, at a communication device of a user, a beacon that corresponds to an area of a resource provider, determining, over a plurality of time points, a plurality of locations of the communication device, wherein the plurality of locations of the communication device comprises a location of the communication device at a first time point of the plurality of time points and a location of the communication device at a second time point of the plurality of time points;
transmitting, by the communication device, the plurality of locations to a computer, which then performs a process including
determining the location of the user at the first time point based on a first image taken of the area at the first time point,
determining the location of the user at the second time point based on a second image taken of the area at the second time point,
determining an association between the communication device and the user based on the location of the communication device at the first time point being proximate to a location of the user at the first time point, and the location of the communication device at the second time point being proximate the location of the user at the second time point, and
determining, based on the association between the communication device and the user, that a transaction is to be conducted between the communication device and an access device; and
responsive to the determining, conducting the transaction between the communication device and the access device.

17. The method of claim 16, wherein the first image and the second image are captured by one or more cameras of the resource provider, the one or more cameras being configured to monitor the area.

18. The method of claim 17, wherein the access device:
determines information indicating the location of the user at the first time point and the location of the user at the second time point; and
transmits the information to the computer, thereby enabling the computer to determine the association between the communication device and the user based on the information.

19. The method of claim 16, wherein the communication device is associated with one or more account identifiers;
wherein one or more account identifiers used to conduct the transaction between the access device and the communication device; and
wherein conducting the transaction between the access device and the communication device comprises using a previously selected account identifier of the one or more account identifiers to conduct the transaction or presenting the one or more account identifiers to the user, thereby enabling the user to select an account identifier from amongst the one or more account identifiers to conduct the transaction.

20. The method of claim 16, wherein the first image and the second image are captured by one or more cameras of the resource provider, the one or more cameras being configured to monitor the area.

* * * * *